(12) United States Patent
Meng et al.

(10) Patent No.: US 11,775,808 B2
(45) Date of Patent: Oct. 3, 2023

(54) NEURAL NETWORK COMPUTATION DEVICE AND METHOD

(71) Applicant: Cambricon Technologies Corporation Limited, Beijing (CN)

(72) Inventors: Xiaofu Meng, Beijing (CN); Haochong Zhang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 703 days.

(21) Appl. No.: 16/714,664

(22) Filed: Dec. 13, 2019

(65) Prior Publication Data

US 2020/0242455 A1 Jul. 30, 2020

(30) Foreign Application Priority Data

Jan. 28, 2019 (CN) .......................... 201910081972.0

(51) Int. Cl.
*G06N 3/063* (2023.01)
*G06F 7/483* (2006.01)
*G06N 3/04* (2023.01)

(52) U.S. Cl.
CPC ............. *G06N 3/063* (2013.01); *G06F 7/483* (2013.01); *G06N 3/04* (2013.01)

(58) Field of Classification Search
CPC ........ G06N 3/063; G06N 3/04; G06N 3/0454; G06N 3/0481; G06N 3/084; G06N 3/02; G06N 3/08; G06F 7/483; G06F 2207/3824; G06F 2207/4824
See application file for complete search history.

(56) References Cited

U.S. PATENT DOCUMENTS

2016/0328646 A1* 11/2016 Lin ....................... G06V 10/454

FOREIGN PATENT DOCUMENTS

CN 106502626 A 3/2017
WO WO-2020223856 A1 * 11/2020

OTHER PUBLICATIONS

CN201910081972.0—Office Action dated Mar. 28, 2023, 10 pages. (With Brief English Translation).

* cited by examiner

*Primary Examiner* — Matthew Mikels
(74) *Attorney, Agent, or Firm* — Getech Law LLC; Jun Ye

(57) ABSTRACT

The present disclosure provides a neural network computation device and a neural network computation method. The device is configured to perform artificial neural network training operations including neural network multi-layer training operations. The present disclosure has technical effects of low cost and low energy consumption.

12 Claims, 10 Drawing Sheets

Legend/Abbreviations:
SPC: SPC

NEURAL NETWORK COMPUTATION DEVICE AND METHOD

TECHNICAL FIELD

The present disclosure relates to artificial neural network, and in particular to a neural network computation device and a method.

BACKGROUND

Neural networks, also known as artificial neural networks, are widely used in the fields such as pattern recognition, image processing, function approximation, and computation optimization. Recently, multi-layer artificial networks have attracted more attention from the academia and industry due to their good recognition accuracy and parallelism. Artificial neural networks involve various algorithms, of which the fully connected layer is an important algorithm in artificial neural networks and is widely used in various artificial neural network models.

Existing neural network operations are performed based on general-purpose processors. However, existing general-purpose processors only support computations of floating point data. Neural network operations, and in particular complex operations, have a large amount of operations and strict memory requirements. When performed based on floating-point data, the existing neural network operations have strict memory requirements. Therefore, the existing solutions have high energy consumption and high cost.

SUMMARY

A first aspect of the present disclosure provides a neural network computation device and a method. The device and the method use fixed point data for computations. Compared with floating point data, fixed point data may save memory and reduce the amount of computations, thus it has the technical effects of reducing energy consumption and cost.

The neural network computation method of the first aspect may be applied to neural network operations of a floating point data type. The computation device includes: a controller unit and an operation unit. The controller unit and the operation unit are connected.

The controller unit is further configured to obtain initial input neuron data of an $i^{th}$ layer of a neural network model of the floating point data type and a computational instruction of the $i^{th}$ layer, parse the computational instruction of the $i^{th}$ layer to obtain a plurality of operation instructions, send the initial input neuron data of the $i^{th}$ layer to the operation unit, and send the plurality of operation instructions to the operation unit, where i is a positive integer.

The operation unit is configured to compute the initial input neuron data of the $i^{th}$ layer, and compute conversion parameters of an $i^{th}$ layer of a neural network model of a fixed point data type according to the initial input neuron data of the $i^{th}$ layer.

The controller unit is further configured to write the conversion parameters of the $i^{th}$ layer of the neural network model of the fixed point data type in the $i^{th}$ layer of the neural network model of the floating point data type.

Optionally, regarding the computing the conversion parameters of the $i^{th}$ layer of the neural network model of the fixed point data type according to the initial input neuron data of the $i^{th}$ layer, the operation unit is configured to compute the conversion parameters of the $i^{th}$ layer of the neural network model of the fixed point data type according to the formula below.

If the conversion parameters only include a value of a decimal point position of a fixed point number, the computation formula is:

a value of a floating point number=a value of a fixed point number×2^position;

or if the conversion parameters only include a value of a scale factor, the computation formula is:

a value of a floating point number=a value of a fixed point number×scale;

or if the conversion parameters include a position value and a scale factor value, the computation formula is:

a value of a floating point number=(a value of a fixed point number×2^position)/scale.

position denotes the decimal point position of a fixed point number, and scale denotes the scale factor.

Alternatively, the neural network training operations include neural network multi-layer training operations. The multi-layer training operations includes the $i^{th}$ layer. Forward operations or back operations of the $i^{th}$ layer at least include some fixed point data operations, where i is an integer greater than or equal to 1. The device further includes a conversion unit.

The controller unit is configured to obtain input neuron data of the $i^{th}$ layer, weight data of the $i^{th}$ layer, and a forward computational instruction of the $i^{th}$ layer; and the controller unit is further configured to parse the computational instruction of the $i^{th}$ layer to obtain a plurality of forward operation instructions, send the input neuron data of the $i^{th}$ layer and the weight data of the $i^{th}$ layer to the conversion unit, and send the plurality of operation instructions to the operation unit.

The conversion unit is configured to, if it is determined that the input neuron data of the $i^{th}$ layer includes a fixed point conversion identifier attribute, convert all or part of the input neuron data of the $i^{th}$ layer and the weight data of the $i^{th}$ layer between the floating point data type and the fixed point data type according to the conversion parameters to obtain complete fixed point data or mixed data, and send the complete fixed point data or mixed data to the operation unit, where the mixed data includes: some fixed point data and some floating point data.

The operation unit is configured to perform fixed point operations on the complete fixed point data or mixed operations on the mixed data according to the plurality of forward operation instructions to obtain forward output results of the $i^{th}$ layer, where the mixed operations include fixed point operations on the some fixed point data and floating point operations on the some floating point data.

A second aspect provides a neural network computation method applied to a neural network computation device. The device is configured to perform artificial neural network operations of a floating point data type. The computation device includes a controller unit and an operation unit. The method includes:

obtaining, by the controller unit, initial input neuron data of an $i^{th}$ layer of a neural network model of the floating point data type and a computational instruction of the $i^{th}$ layer, parsing the computational instruction of the $i^{th}$ layer to obtain a plurality of operation instructions, sending the initial input neuron data of the $i^{th}$ layer to the operation unit, and sending the plurality of operation instructions to the operation unit, where i is a positive integer;

computing, by the operation unit, the initial input neuron data of the $i^{th}$ layer, and computing conversion parameters of an $i^{th}$ layer of a neural network model of a fixed point data type according to the initial input neuron data of the $i^{th}$ layer; and writing, by the controller unit, the conversion parameters of the $i^{th}$ layer of the neural network model of the fixed point data type into the $i^{th}$ layer of the neural network model of the floating point data type.

Optionally, the computing the conversion parameters of the $i^{th}$ layer of the neural network model of the fixed point data type according to the initial input neuron data of the $i^{th}$ layer includes:

if the conversion parameters only include a value of a decimal point position of a fixed point number, the computation formula is:

a value of a floating point number=a value of a fixed point number×2^position;

or if the conversion parameters only include a value of a scale factor, the computation formula is:

a value of a floating point number=a value of a fixed point number×scale;

or if the conversion parameters include a position value and a scale factor value, the computation formula is:

a value of a floating point number=(a value of a fixed point number×2^position)/scale.

position denotes the decimal point position of a fixed point number, and scale denotes the scale factor.

Alternatively, the neural network training operations include neural network multi-layer training operations. The multi-layer training operations includes the $i^{th}$ layer. Forward operations or back operations of the $i^{th}$ layer at least include some fixed point data operations, where i is an integer greater than or equal to 1. The neural network computation device further includes a conversion unit. The method further includes:

obtaining, by the controller unit, input neuron data of the $i^{th}$ layer, weight data of the $i^{th}$ layer, and a forward computational instruction of the $i^{th}$ layer;

parsing, by the controller unit, the computational instruction of the $i^{th}$ layer to obtain a plurality of forward operation instructions, sending the input neuron data of the $i^{th}$ layer and the weight data of the $i^{th}$ layer to the conversion unit, and sending the plurality of operation instructions to the operation unit;

if it is determined that the input neuron data of the $i^{th}$ layer includes a fixed point conversion identifier attribute, converting, by the conversion unit, all or part of the input neuron data of the $i^{th}$ layer and the weight data of the $i^{th}$ layer between the floating point data type and the fixed point data type according to the conversion parameters to obtain complete fixed point data or mixed data, and sending the complete fixed point data or mixed data to the operation unit, where the mixed data includes: some fixed point data and some floating point data; and performing, by the operation unit, fixed point operations on the complete fixed point data or mixed operations on the mixed data according to the plurality of forward operation instructions to obtain forward output results of the $i^{th}$ layer, where the mixed operations include fixed point operations on the some fixed point data and floating point operations on the some floating point data.

A third aspect of the present disclosure provides a neural network training computation device. The neural network training computation device includes one or a plurality of the computation devices of the first aspect, which is configured to obtain data to be operated and control information from another processing device, perform specified operations, and transfer execution results to another processing device through an I/O interface.

If the neural network training computation device includes a plurality of the computation devices, the plurality of the computation devices are connected to each other in a specific structure and transfer data to each other.

Through an express external device interconnect bus (a PCIE bus), the plurality of the computation devices are interconnected and transfer data to each other to support large scale neural network training operations. The plurality of the computation devices share a same control system, or have separate control systems. The plurality of the computation devices share a memory, or have their own memories. An interconnection method of the plurality of the computation devices can be any interconnection topology.

A fourth aspect of the present disclosure provides a combined processing device which includes the above-mentioned neural network training computation device, a general interconnection interface, and another processing device.

The neural network training computation device interacts with another processing device to perform computations specified by users.

A fifth aspect provides a neural network chip which includes the above-mentioned computation device, or the above-mentioned neural network training computation device, or the above-mentioned combined processing device.

A sixth aspect provides an electronic device which includes the above-mentioned chip.

A seventh aspect provides a board card which includes a storage component, an interface device, a control component, and the above-mentioned neural network chip.

The neural network chip is connected to the storage component, the interface device, and the control component respectively;

The storage component is configured to store data;

The interface device is configured to transfer data between the chip and an external device.

The control component is configured to monitor a status of the chip.

With the examples of the present disclosure, for the neural network model of the floating point data type, by computing the conversion parameters of the fixed point data type and writing the conversion parameters in the neural network model of the floating point data type, input data may be converted to fixed point data for computations according to the conversion parameters during subsequent data input. Since fixed point data can save memory and reduce computations, the above-mentioned technical schemes may have technical effects of reducing energy consumption and cost.

BRIEF DESCRIPTION OF THE DRAWINGS

For a thorough understanding of the present disclosure and its technical effects, a description will be give below with reference to the drawings, in which.

DETAILED DESCRIPTION

Figure 1:
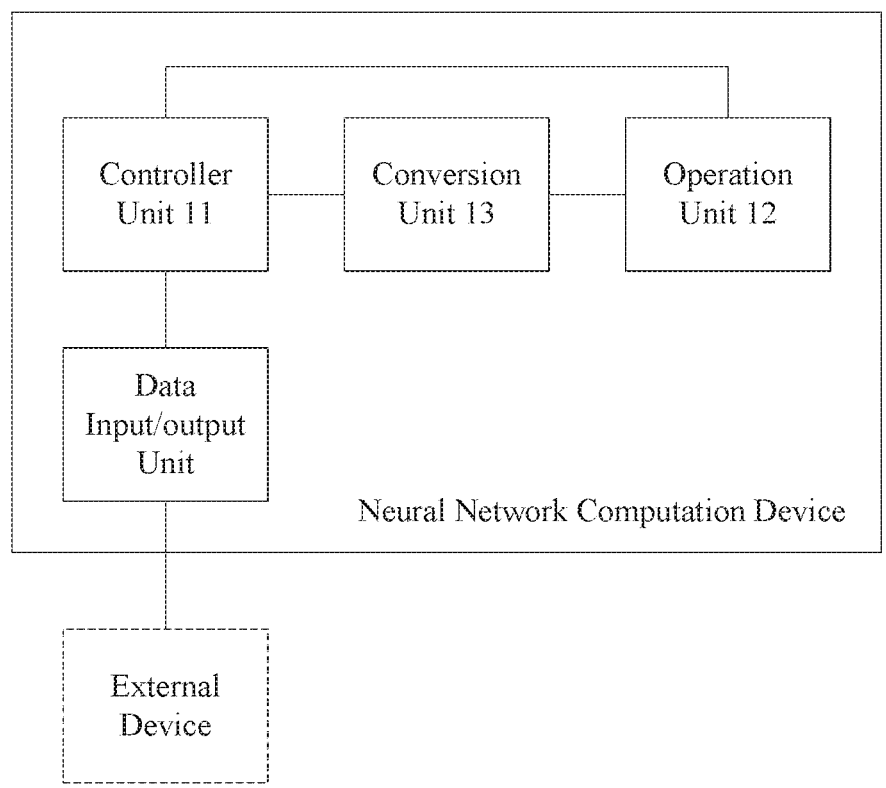
FIG. 1 is a block diagram showing an overall structure of a neural network computation device of an example of the present disclosure.

To help those skilled in the art to understand the present disclosure better, technical solutions in examples of the present disclosure will be described clearly and completely hereinafter with reference to the drawings in the examples of the present disclosure. Obviously, the examples to be described are merely some rather than all examples of the present disclosure. All other examples obtained by those of ordinary skill in the art based on the examples of the present disclosure without creative efforts shall fall within the protection scope of the present disclosure.

The terms "first", "second", and the like in the description and claims of the present disclosure and the above-mentioned drawings are used for distinguishing different objects rather than describing a specific order. Furthermore, the terms "including" and "having", as well as any variant of them, are intended to cover a non-exclusive inclusion. For instance, a process, a method, a system, a product, or a device including a series of steps or units is not limited to listed steps or units, but may optionally include steps or units that are not listed, or may optionally include other steps or units inherent to the process, method, product, or device.

The term "example" herein means that a feature, a structure, or a characteristic described in conjunction with examples may be included in at least one example of the present disclosure. The term used in various places in the specification does not necessarily refer to the same example, nor does it refer to an example that is mutually exclusive, independent, or alternative to other examples. It can be explicitly and implicitly understood by those skilled in the art that the examples described herein may be combined with other examples.

An electronic device may include various handheld devices, vehicle-mounted devices, wireless headsets, computation devices, or other processing devices connected to a wireless modem that have wireless communication capabilities. The electronic device may further include various forms of user equipment (UE), mobile stations (MS), terminal devices, and the like. The electronic device may be, for instance, a smart phone, a tablet, a headset box, or the like. For ease of description, the above-mentioned devices are referred to as an electronic device or electronic equipment.

The electronic device or electronic apparatus may be used for data processing in scenarios including, but not limited to a robot, a computer, a printer, a scanner, a telephone, a tablet, a smart terminal, a mobile phone, a traffic recorder, a navigator, a sensor, a webcam, a cloud-based server, a camera, a video camera, a projector, a watch, a headphone, a mobile storage, a wearable device. The electronic device or electronic apparatus may be applied to vehicles such as an airplane, a ship, and a car. The electronic device or electronic apparatus may be applied to household appliances such as a television, an air conditioner, a microwave oven, a refrigerator, a rice cooker, a humidifier, a washing machine, an electric lamp, a gas cooker, and a range hood. The electronic device or electronic apparatus may be applied to medical equipment such as a nuclear magnetic resonance spectrometer, a B-ultrasonic scanner, and an electrocardiograph.

The examples of the present disclosure will be explained hereinafter.

First, a computation device used in the present disclosure is introduced. Referring to FIG. 1, a neural network computation device is provided. The device is configured to perform neural network training operations of a floating point data type. The computation device includes: a controller unit 11, an operation unit 12, and a conversion unit 13. The controller unit 11 is connected to the operation unit 12 and the conversion unit 13 (the conversion unit may be set separately, or may be integrated in the controller unit or the operation unit). The training operations of an layer include forward operations of the $i^{th}$ layer and back operations of the $i^{th}$ layer.

The controller unit is configured to obtain initial input neuron data of an $i^{th}$ layer of a neural network model of the floating point data type and a computational instruction of the $i^{th}$ layer, parse the computational instruction of the $i^{th}$ layer to obtain a plurality of operation instructions, send the initial input neuron data of the $i^{th}$ layer to the operation unit, and send the plurality of operation instructions to the operation unit, where i is a positive integer.

The operation unit is configured to compute the initial input neuron data of the $i^{th}$ layer, and compute conversion parameters of the $i^{th}$ layer of the neural network model of a fixed point data type according to the initial input neuron data of the $i^{th}$ layer.

The controller unit is further configured to write the conversion parameters of the $i^{th}$ layer of the neural network model of the fixed point data type in the $i^{th}$ layer of the neural network model of the floating point data type.

Data of the floating point data type may be 32-bit floating point data, fixed point data may be understood as data of the fixed point data type which may be 8-bit fixed point data.

Optionally, the writing the conversion parameters in the neural network of the floating point data type may be understood as follows: the conversion parameters of each layer may be stored in a storage area for storing the parameters in the layer, meanwhile, the conversion parameters may be obtained for using when the parameters are required.

Optionally, a method of computing the conversion parameters of the $i^{th}$ layer of the neural network model of the fixed point data type according to the initial input neuron data of the $i^{th}$ layer may include:

computing, by the operation unit, the conversion parameters of the $i^{th}$ layer of the neural network model of the fixed point data type according to the following formula:

if the conversion parameters only include a value of a decimal point position of a fixed point number, the computation formula is:

a value of a floating point number=a value of a fixed point number×2^position;

or if the conversion parameters only include a value of a scale factor, the computation formula is:

a value of a floating point number=a value of a fixed point number×scale;

or if the conversion parameters include a position value and a scale factor value, the computation formula is:

a value of a floating point number=(a value of a fixed point number×2^position)/scale.

position denotes the decimal point position of a fixed point number, and scale denotes the scale factor.

Alternatively, the neural network training operations include neural network multi-layer training operations. The multi-layer training operations includes the $i^{th}$ layer. The forward operations or the back operations of the $i^{th}$ layer at least include some fixed point data operations, where i is an integer greater than or equal to 1.

A type of the forward operations of the $i^{th}$ layer may include:

obtaining, by the controller unit 11, input neuron data of the $i^{th}$ layer, weight data of the $i^{th}$ layer, and a forward computational instruction of the $i^{th}$ layer. In an alternative example, the input neuron data and the computational instruction may be obtained by a data input/output unit. The data input/output unit may be one or a plurality of data I/O interfaces or I/O leads, and is configured to read the input neuron data or the forward computational instruction from an external device or an external memory.

The forward computational instruction includes, but not limited to a convolution operation instruction, a matrix multiplication instruction, a vector multiplication instruction, an activation instruction, and the like. An embodiment of the present disclosure does not limit the representation or type of the forward computational instruction.

The type of the forward operations of the $i^{th}$ layer may include: parsing, by the controller unit 11, the computational instruction of the $i^{th}$ layer to obtain a plurality of forward operation instructions, sending the input neuron data of the $i^{th}$ layer, the weight data of the $i^{th}$ layer to the conversion unit 13, and sending the plurality of operation instructions to the operation unit 12;

if it is determined that the input neuron data of the $i^{th}$ layer includes a fixed point conversion identifier attribute, converting, by the conversion unit 13, all or part of the input neuron data of the $i^{th}$ layer and the weight data of the $i^{th}$ layer between the floating point data type and the fixed point data type according to the conversion parameters to obtain complete fixed point data or mixed data, and sending the complete fixed point data or mixed data to the operation unit, where the mixed data includes: some fixed point data and some floating point data; and performing, by the operation unit 12, fixed point operations on the complete fixed point data or mixed operations on the mixed data according to the plurality of forward operation instructions to obtain forward output results of the $i^{th}$ layer.

The back operations of the $i^{th}$ layer may include:

obtaining, by the controller unit 11, input neuron data of the $i^{th}$ layer, weight data of the $i^{th}$ layer, and a back computational instruction of the $i^{th}$ layer. In an alternative example, the input neuron data and the computational instruction may be obtained by a data input/output unit. The data input/output unit may be one or a plurality of data I/O interfaces or I/O leads, and is configured to read the input neuron data or the back computational instruction from an external device or an external memory.

The back computational instruction includes, but not limited to a matrix multiplication instruction, a vector multiplication instruction, and the like. An embodiment of the present disclosure does not limit the representation or type of the back computational instruction.

The back operations of the $i^{th}$ layer may include: parsing, by the controller unit 11, the computational instruction of the $i^{th}$ layer to obtain a plurality of back operation instructions, sending the input neuron data of the $i^{th}$ layer, the weight data of the $i^{th}$ layer, and input neuron gradients of the $i^{th}$ layer to the conversion unit 13, and sending the plurality of operation instructions to the operation unit 12;

converting, by the conversion unit 13, all or part of the input neuron data of the $i^{th}$ layer, the weight data of the $i^{th}$ layer, and the input neuron gradients of the $i^{th}$ layer between floating point data and fixed point data to obtain complete fixed point data or mixed data, and sending the complete fixed point data or mixed data to the operation unit, where the mixed data includes: some fixed point data and some floating point data; and performing, by the operation unit 12, fixed point operations on the complete fixed point data or mixed operations on the mixed data according to the plurality of back operation instructions to obtain weight gradients of the $i^{th}$ layer and output result gradients of the $i^{th}$ layer, and using the weight gradients of the $i^{th}$ layer to update weights of the $i^{th}$ layer.

The mixed operations include fixed point operations on the some fixed point data and floating point operations on the some floating point data.

The technical scheme of the example provides the conversion unit which is configured to convert all or part of input neuron data, weight data, input data, and neuron gradients into fixed point data or mixed data when performing training operations of the $i^{th}$ layer of the neural network. Compared with floating point data, fixed point data requires less storage space, so that neural network training can be realized with less storage space. Therefore, the computation device provided by the disclosure may reduce the memory capacity as well as reduce the cost. In addition, when the technical scheme of the example is adopted, the training operations of the $i^{th}$ layer at least include operations of the some fixed point data, which may reduce the amount of operations compared with floating point data operations. Thus, the technical scheme may improve the speed of operations.

The neural network training operations may be training operations of a layer of the neural network, which are training operations of the $i^{th}$ layer. Training operations of other layers may be performed according to a conventional method of training operations, or according to a method similar to the training operation method of the $i^{th}$ layer of the present disclosure. An implementation process for a multi-layer neural network is as follows: in forward operations, after the forward operations of a previous layer of the artificial neural network are completed, a computational instruction of a next layer uses an output neuron (which is a forward output result) obtained by the operation unit as an input neuron to the next layer for operations (or the output neuron may be subject to some operations before being used as the input neuron of the next layer). The above-mentioned some operations include but not limited to activation operations. At the same time, a weight of the previous layer is replaced with a weight of the next layer. In back operations, after the back operations of a next layer of the artificial neural network are completed, a computational instruction of a previous layer uses an output neuron gradient (which is an output result gradient) obtained by the operation unit as an input neuron gradient of the previous layer for operations (or the output neuron gradient may be subject to some operations before being used as the input neuron gradient of the next layer). At the same time, a weight and input neuron data are replaced with a weight and input neuron data of the forward operations of the previous layer.

If artificial neural network operations have operations of multiple layers, input neurons and output neurons of the multi-layer operations do not refer to neurons in an input layer and in an output layer of the entire neural network. For any two adjacent layers in the network, neurons in a lower layer of the network forward operations are the input neurons, and neurons in an upper layer of the network forward operations are the output neurons. A convolutional neural network is taken as an instance here. It is supposed that the convolutional neural network has L layers, where K=1, L−1 For a K-th layer and a K+1-th layer, the K-th layer is regarded as an input layer of which the neurons are referred to as input neurons; and the K+1 layer is regarded as an output layer of which the neurons are referred to as output neurons. In other words, except a top layer, each layer may be an input layer, and a lower layer of that layer is a corresponding output layer.

Optionally, the conversion unit 13 is configured to convert part of the input neuron data of the $i^{th}$ layer to some fixed point input neuron data, convert part of the weight data of the $i^{th}$ layer to some fixed point weight data, send the some fixed point input neuron data and the some fixed point weight data to the operation unit, and send some input neuron data (remaining floating point data that is not subject to the floating point/fixed point conversion) and some weight data (remaining floating point data that is not subject to the floating point/fixed point conversion) to the operation unit.

The operation unit is configured to perform fixed point data operations on the some fixed point input neuron data and the some fixed point weight data to obtain some fixed point forward output results, and send the some fixed point forward output results to the conversion unit.

The conversion unit is configured to convert the some fixed point forward output results between fixed point data and floating point data to obtain a first set of some floating point forward operation results, and send the first set of some floating point forward operation results to the operation unit.

The operation unit is configured to perform operations (floating point operations) on the some input neuron data and the some weight data to obtain a second set of some floating point forward operation results, and combine the first set of some floating point forward operation results and the second set of some floating point forward operation results to obtain forward output results of the $i^{th}$ layer.

Alternatively, the conversion unit 13 is configured to convert part of the input neuron data of the $i^{th}$ layer to some fixed point input neuron data, convert part of the weight data of the $i^{th}$ layer to some fixed point weight data, convert the input neuron gradients of the $i^{th}$ layer to some fixed point input neuron gradients, send the some fixed point input neuron data, the some fixed point input neuron gradients and the some fixed point weight data to the operation unit, and send some input neuron data (remaining floating point data that is not subject to the floating point/fixed point conversion), some input neuron gradients and some weight data (remaining floating point data that is not subject to the floating point/fixed point conversion) to the operation unit.

The operation unit is configured to perform fixed point data operations on the some fixed point input neuron gradients and the some fixed point input data to obtain some weight gradients of the $i^{th}$ layer, perform fixed point data operations on the some fixed point input neuron gradients and the some fixed point weight data to obtain some output result gradients of the $i^{th}$ layer, and send the some weight gradients of the $i^{th}$ layer and the some output result gradients of the $i^{th}$ layer to the conversion unit.

The conversion unit is configured to convert the some weight gradients of the $i^{th}$ layer and the some output result gradients of the $i^{th}$ layer between floating point data and fixed point data to obtain a first set of some weight gradients of the $i^{th}$ layer and a first set of some output result gradients of the $i^{th}$ layer, and send the first set of some weight gradients of the $i^{th}$ layer and the first set of some output result gradients of the $i^{th}$ layer to the operation unit.

The operating unit is configured to perform operations (floating point) on the some input neuron gradients and the some input data to obtain a second set of some weight gradients of the $i^{th}$ layer, perform operations on the some input neuron gradients and the some weight data to obtain a second set of some output result gradients of the $i^{th}$ layer, combine the first set of some weight gradients of the $i^{th}$ layer and the second set of some weight gradients of the $i^{th}$ layer to obtain weight gradients of the $i^{th}$ layer, and combine the first set of some output result gradients of the $i^{th}$ layer and the second set of some output result gradients of the $i^{th}$ layer to obtain output result gradients of the $i^{th}$ layer.

Alternatively, the conversion unit 13 is configured to determine point which denotes a position of a decimal point of floating point number, point=⌈(log$_2$(max abs)−width+2)⌉ where width denotes a bit width of a fixed point number, and max abs denotes a largest absolute value in floating point data to be converted, that is, the largest absolute value among the elements of the input neuron data and the weight data of the $i^{th}$ layer. In this way, a largest value that can be represented by a fixed point number is greater than a smallest point (the position of point) value of max abs.

For known point and width, a floating point number and a floating point number:

$$int = \begin{cases} -2^{width-1}, & \text{if float} < -2^{width+point-1} \\ \text{round}(\text{float}/2^{point}), & \text{if } -2^{width+point-1} \leq \text{float} \leq (2^{point-1}-1)*2^{point} \\ 2^{width-1}-1, & \text{if float} > (2^{width-1}-1)*2^{point} \end{cases}$$

round denotes rounding by 4/5,
and float=int*$2^{point}$ int denotes a fixed point value, float denotes a floating point value, and point denotes digits of a fractional part of a fixed point number.

For instance, width=8, max abs=16, then point=−2.

Alternatively, a method of obtaining the input neuron gradients of the $i^{th}$ layer may include: the input neuron gradients of the $i^{th}$ layer=f*the output result gradients of the i+$1^{th}$ layer, where f' denotes a derived function of an activation function f.

Figure 2:
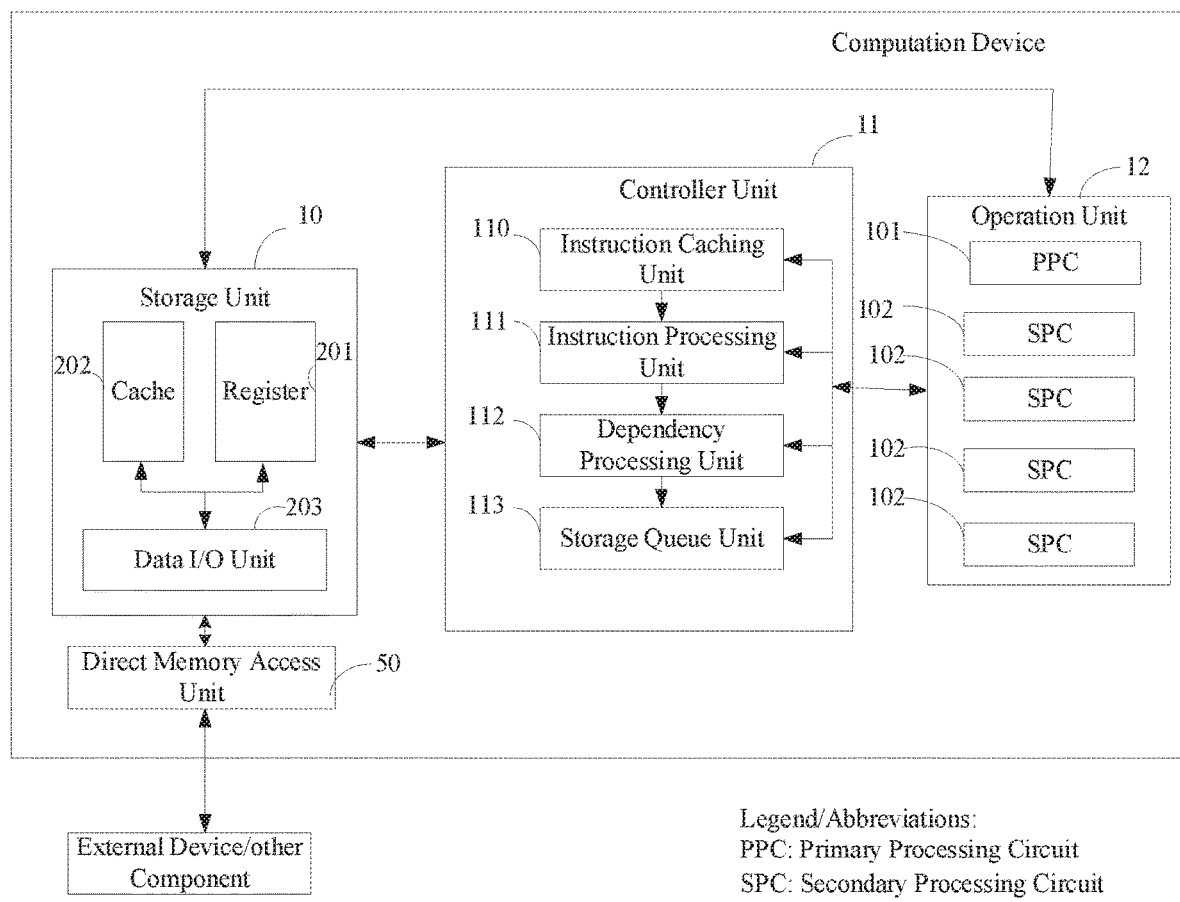
FIG. 2 is a structural diagram showing another neural network computation device of an example of the present disclosure.
Figure 2A:
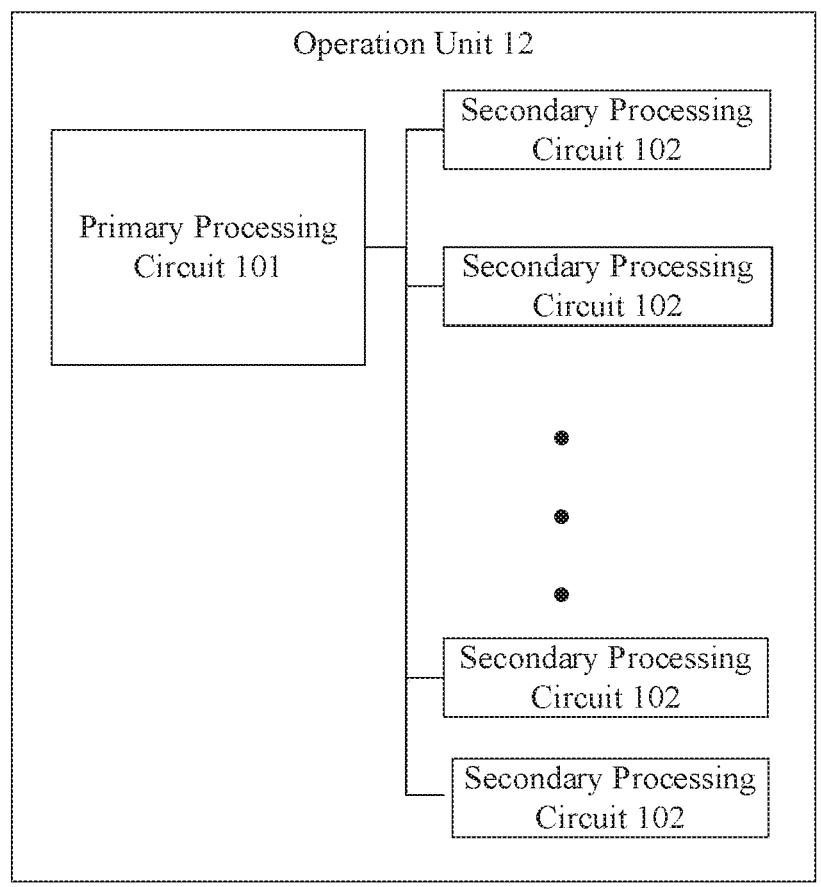
FIG. 2a is a structural diagram of an operation unit of an example of the present disclosure.

Alternatively, referring to FIG. 2a, the operation unit may include a primary processing circuit 101 and a plurality of secondary processing circuits 102, where the primary processing circuit 101 is configured to pre-process data (including one or more of input neuron data, weight data, and input neuron gradients, where the data may be fixed point or floating point) and transfer data and operation instructions to the plurality of secondary processing circuits.

The plurality of secondary processing circuits 102 are configured to perform intermediate operations in parallel according to data (fixed point or floating point) and operation instructions transferred by the primary processing circuit to obtain a plurality of intermediate results, and transfer the plurality of intermediate results to the primary processing circuit.

The primary processing circuit 101 is configured to obtain a forward output result of the $i^{th}$ layer, an output result gradient of the $i^{th}$ layer, and a weight gradient of the $i^{th}$ layer according to the plurality of intermediate results, and update a weight of the $i^{th}$ layer according to the weight gradient of the $i^{th}$ layer.

Alternatively, the activation function f may be any of the following nonlinear functions: sigmoid, tan h, relu, softmax, or may be a linear function.

The operation instructions include: a CONFIG instruction, a COMPUTE instruction, an IO instruction, a NOP instruction, a JUMP instruction, or a MOVE instruction.

Alternatively, the primary processing circuit includes a first storage unit, a first operation unit, a first data dependency determination unit, and a first storage unit, in which:

a neuron caching unit is configured to cache input data and output data used by the primary processing circuit when performing computations;

the first operation unit is configured to perform various operation functions of the primary processing circuit; and the first data dependency determination unit is configured to read an input neuron vector from the first storage unit, send the input neuron vector to the secondary processing circuits through an interconnection module, and receive an intermediate result vector from the interconnection module, and send the intermediate result vector to the first operation unit.

Alternatively, the first operation unit includes: a vector addition unit and an activation operation unit.

The vector addition unit is configured to perform element-wise addition on bias data and the intermediate results to obtain a bias result.

The activation operation unit is configured to perform an activation function operation on the bias result.

Alternatively, each secondary processing circuit includes a second operation unit, a second data dependency determination unit, a second storage unit, and a third storage unit.

The second operation unit is configured to perform arithmetic logic operations.

The second data dependency determination unit is configured to perform read/write operations on the second storage unit and the third storage unit.

The second storage unit is configured to cache data of an input neuron vector and cache an output neuron value obtained by the secondary processing circuit.

The third storage unit is configured to cache a weight vector required during a computation of the secondary processing circuit.

Alternatively, the second operation unit includes: a vector multiplication unit and an accumulation unit.

The vector multiplication unit is configured to perform vector multiplication operations in dot product operations.

The accumulation unit is configured to perform accumulation operations in dot product operations.

The above-mentioned process of updating weights may include that:

transferring, by the primary processing circuit 101, the input neuron data of the $i^{th}$ layer to each secondary processing circuit respectively, transferring the input neuron gradients of the $i^{th}$ layer to each secondary processing circuit 102; multiplying, by each secondary processing circuit 102, scalar data corresponding to the secondary processing circuit in the input neuron gradients in gradient of the $i^{th}$ layer by the input neuron data of the $i^{th}$ layer to obtain original weight update gradient vectors dw_original of the $i^{th}$ layer of the secondary processing circuit. After obtaining the original weight update gradient vectors of all layers, in order to restrict a gradient range of the weights, performing, by the primary processing circuit, restriction processing on original weight update gradients; specifically, computing, by the primary processing circuit, a quadratic sum sumsq_diff of the original weight update gradients of all layers, then extracting a root of sumsq_diff to obtain l2norm_diff, if l2norm_diff is greater than clip gradient (a given positive constant), computing, by the primary processing circuit, a scale factor, where scale_factor=clip_gradient/l2norm_diff; multiplying all the original weight update gradients dw_original by the scale factor scale_factor respectively to obtain weight update gradients dw', and sending the update gradients dw' to each secondary processing circuit; and multiplying, by the secondary processing circuit, the weight update gradients dw' by the weights to obtain update weights of each secondary processing circuit of the $i^{th}$ layer.

In the technical solution provided by the present disclosure, the operation unit has a structure of one-primary and multiple-secondaries. For computational instructions of forward operations, the structure may partition data according to the computational instructions of the forward operations, so that parallel operations can be performed for a part with a large amount of computations through the plurality of secondary processing circuits. In this way, the operation speed may be improved, the operation time be saved, which may further reduce the power consumption. For back operations, data may also be partitioned. Similar to the forward operations, the operation speed may be improved.

Alternatively, each of the primary processing circuit and the secondary processing circuits may include a storage module configured to store data of the primary processing circuit or the secondary processing circuits. It should be explained that the primary processing circuit and the secondary processing circuits may share the storage module. In other words, one or a plurality of areas in the storage module of the primary processing circuit may be used as shared areas, and the storage space of the shared areas may be used (including data reading or writing) by the plurality of secondary processing circuits. One or a plurality of areas in the storage module of the secondary processing circuits may also be used as shared areas, and the storage space of the shared areas may be used (including data reading or writing) by primary processing circuit.

The technical solution provides an area-sharing plan of storage module. Compared with a solution of a fixed storage module, the sharing of storage module by the interconnected primary processing circuit and the plurality of secondary processing circuits may help to avoid the problem that computations cannot be performed due to insufficient storage. In addition, the sharing of storage module reduces the storage space required by the storage area of the primary processing circuit, which may greatly reduce the cost of the primary processing circuit. Moreover, compared with obtaining data from external devices, the present technical solution may reduce the overhead of data reading or writing. Regarding the present computation device, when data is read from or written in external devices, the data needs to be forwarded by the controller unit, the conversion unit, and the like. In this case, for neural network operations, the data needs to go through multiple components, thereby causing high data read/write overhead and high energy consumption. By setting a shared area in the primary processing circuit and the secondary processing circuit, when the space of the storage module of the primary processing circuit or of the secondary processing circuits is insufficient, there is no need to store the data in an external device, instead, the data may be stored in the operation unit directly, thereby greatly reducing the overhead.

Alternatively, referring to FIG. 2, the computation device may further include: a storage unit and a direct memory access unit 50, where the storage unit 10 may include one or more of a register and a cache. Specifically, the cache is configured to store the computational instruction. The register is configured to store the input neuron data, the weight data, the input neuron gradients, and scalars. The cache is a high-speed temporary cache. The direct memory access unit 50 is configured to read data from or store data in the storage unit 10.

Alternatively, the controller unit includes an instruction storage unit 110, an instruction processing unit 111, and a storage queue unit 113.

The instruction storage unit 110 is configured to store a computational instruction associated with the artificial neural network operations.

The instruction processing unit 111 is configured to parse the computational instruction to obtain a plurality of operation instructions.

The storage queue unit 113 is configured to store an instruction queue that includes a plurality of operation instructions or computational instructions that are to be performed and are sorted in sequential order of the instruction queue.

For instance, in an optional technical solution, a primary operation processing circuit may include a controller unit, where the controller unit may include a primary instruction processing unit configured to decode an instruction to a micro-instruction. In another optional technical solution, each secondary processing circuit may include another controller unit, where another controller unit includes a secondary instruction processing unit configured to receive and process the micro-instruction. The micro-instruction may be an instruction in a next level of the instruction. The micro-instruction may be obtained by partitioning or decoding the instruction, and may be further decoded into control signals for each component, each unit, or each processing circuit.

As an optional example, the table below shows a structure of the computational instruction.

| opcode | register or immediate value | register/ immediate value | ... |
|--------|------------------------------|---------------------------|-----|

The ellipses in the table above indicate that a plurality of registers or immediate values may be included.

In another alternative example, the computational instruction may include one or a plurality of operation fields and one opcode. The computational instruction may include a neural network operation instruction. Taking a neural network operation instruction as an instance, as shown in the table 1, register number 0, register number 1, register number 2, register number 3, and register number 4 may be operation fields. Register number 0, register number 1, register number 2, register number 3, and register number 4 may be the numbers of one or a plurality of registers.

| opcode | register number 0 | register number 1 | register number 2 | register number 3 | register number 4 |
|--------|-------------------|-------------------|-------------------|-------------------|-------------------|
| COMPUTE | input address start address | input address length | weight start address | weight length | address of an activation function interpolation table |
| IO | address of an external memory of data | data length | address of an internal memory of data | | |
| NOP | | | | | |
| JUMP | target address | | | | |
| MOVE | input address | data size | output address | | |

The register may be an off-chip memory. In certain applications, the register may also be an on-chip memory for storing data. The data may be n-dimensional data, where n is an integer greater than or equal to 1. For instance, when n=1, the data is one-dimensional data which is a vector, when n=2, the data is two-dimensional data which is a matrix, and when n=3 or above 3, the data is multi-dimensional tensor.

Figure 2B:
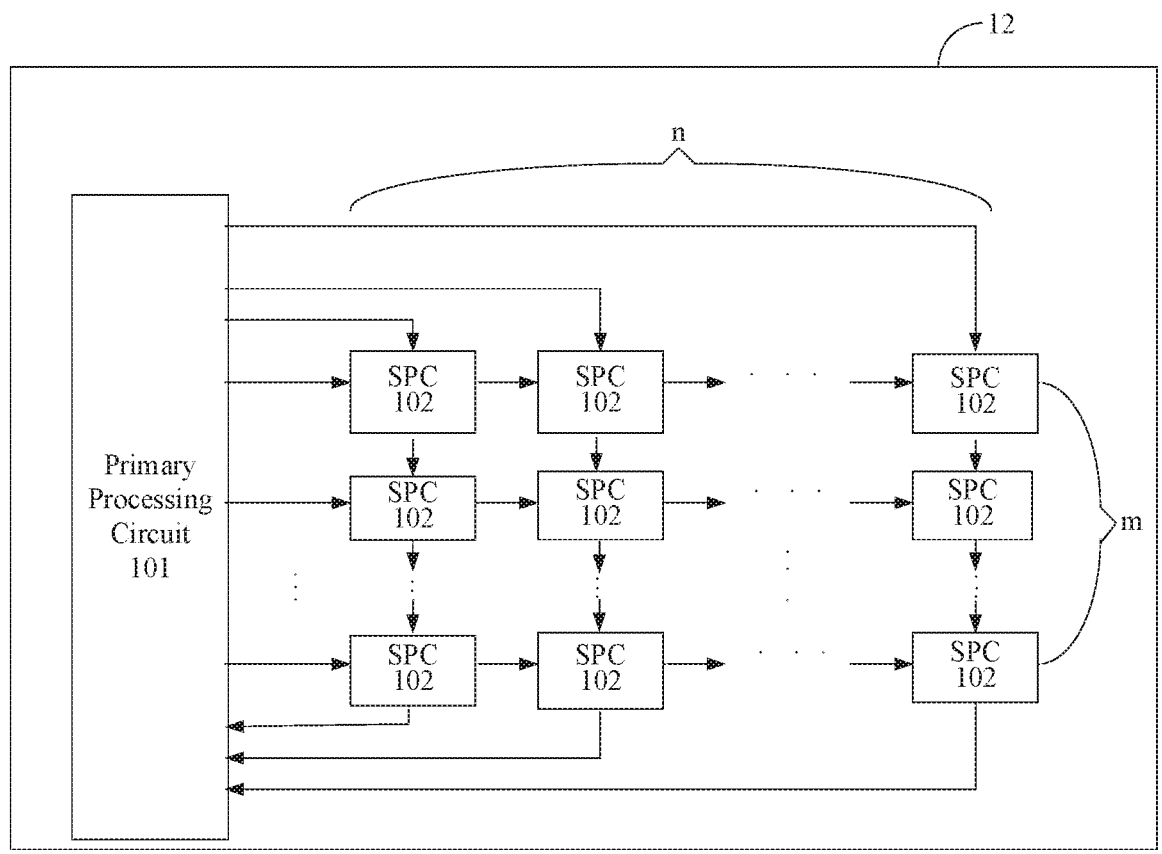
FIG. 2b is another structural diagram of an operation unit of an example of the present disclosure.

In another alternative example, as shown in FIG. 2a, the operation unit 12 may include one primary processing circuit 101 and a plurality of secondary processing circuits 102. In an example, as shown in FIG. 2b, the plurality of secondary processing circuits are arranged in the form of an array. Each secondary processing circuit is connected to another adjacent secondary processing circuit, and the primary processing circuit is connected to k secondary processing circuits of the plurality of secondary processing circuits, where the k secondary processing circuits are: n secondary processing circuits in a first row, n secondary processing circuits in an $m^{th}$ row, and m secondary processing circuits in a first column. It should be explained that, as shown in FIG. 2b, the k secondary processing circuits only include n secondary processing circuits in the first row, n secondary processing circuits in the $m^{th}$ row, and m secondary processing circuits in the first column. In other words, the k secondary processing circuits are secondary processing circuits that are connected to the primary processing circuit directly in the plurality of secondary processing circuits.

The k secondary processing circuits are configured to forward data and instructions among the primary processing circuit and the plurality of secondary processing circuits.

Alternatively, the conversion unit may be set inside the primary processing circuit 101.

The primary processing circuit may further include:
an activation processing circuit 111 configured to perform activation operations or derivative operations on data in the primary processing circuit; and
an addition processing circuit 112 configured to perform addition operations or accumulation operations.

The primary processing circuit is configured to determine the input neuron data as data for broadcasting, the weight data as data for distribution, divide the data for distribution into a plurality of data blocks, and send at least one of the data blocks and at least one operation instruction of a plurality of operation instructions to the secondary processing circuits.

The plurality of secondary processing circuits are configured to perform operations on received data blocks according to the operation instruction to obtain intermediate results, and transfer the intermediate results to the primary processing circuit.

The primary processing circuit is configured to receive a forward output result of the $i^{th}$ layer, an output result gradient of the $i^{th}$ layer, and a weight gradient of the $i^{th}$ layer, and update a weight of the $i^{th}$ layer according to the weight gradient of the $i^{th}$ layer.

The secondary processing circuit includes a multiplication processing circuit.

The multiplication processing circuit is configured to perform product operations on received data blocks to obtain product results.

A forwarding processing circuit (optional) is configured to forward received data blocks or product results.

The accumulation processing circuit is configured to accumulate the product results to obtain the intermediate results.

In another example, the operation instruction may be a computational instruction such as a matrix-multiply-matrix instruction, an accumulation instruction, an activation instruction, and the like.

A computation method of the computation device shown in FIG. 1 will be explained based on a neural network operation instruction. A formula to be perform by the neural network operation instruction may be: $s=s(\Sigma wx_t+b)$, which is to multiply a weight w by input data $x_t$, find the sum, add a bias b, perform an activation operation s(h), and obtain a final output result s.

Figure 2C:
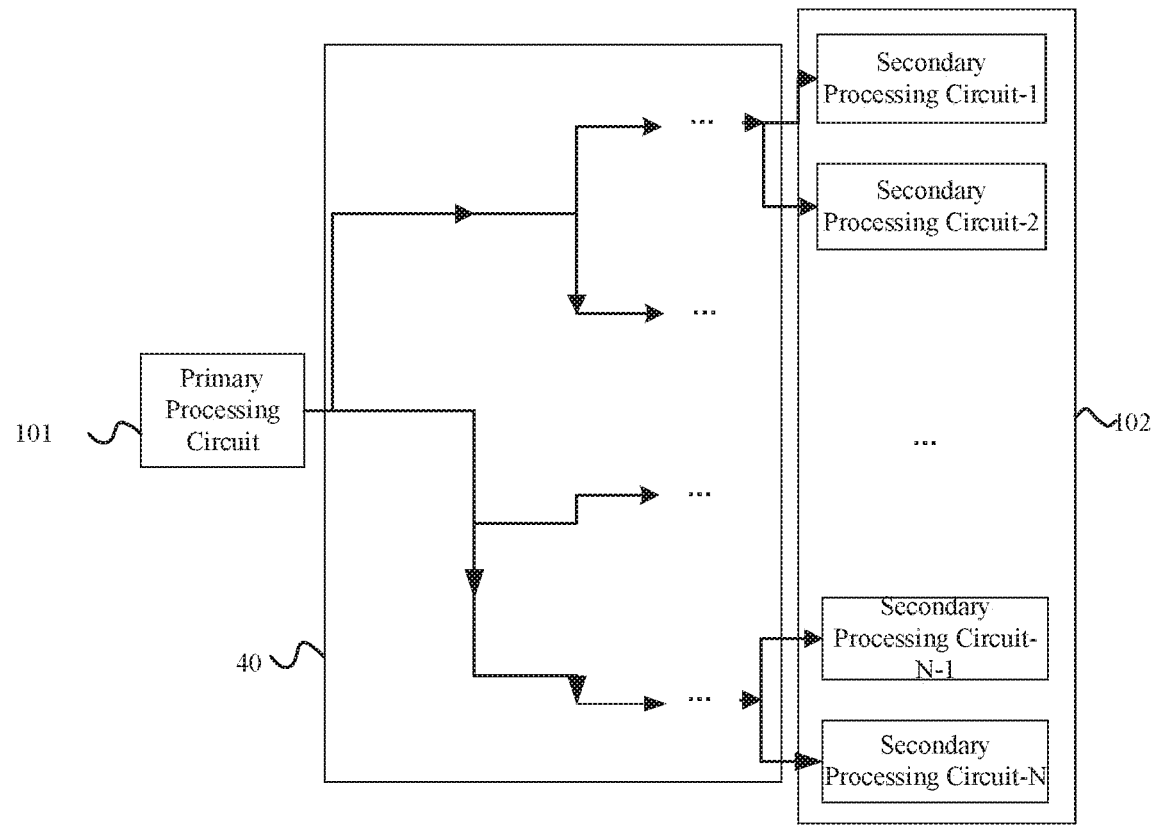
FIG. 2c is a transferring diagram of a tree module of an example of the present disclosure.

As an alternative example, as shown in FIG. 2c, the device may further include: a tree module 40, where the tree module includes: a root port 401 and a plurality of branch ports 404, in which the root port of the tree module is connected to the primary processing circuit, and each of the plurality of branch ports of the tree module is connected to a secondary processing circuit of the plurality of secondary processing circuits.

Figure 2D:
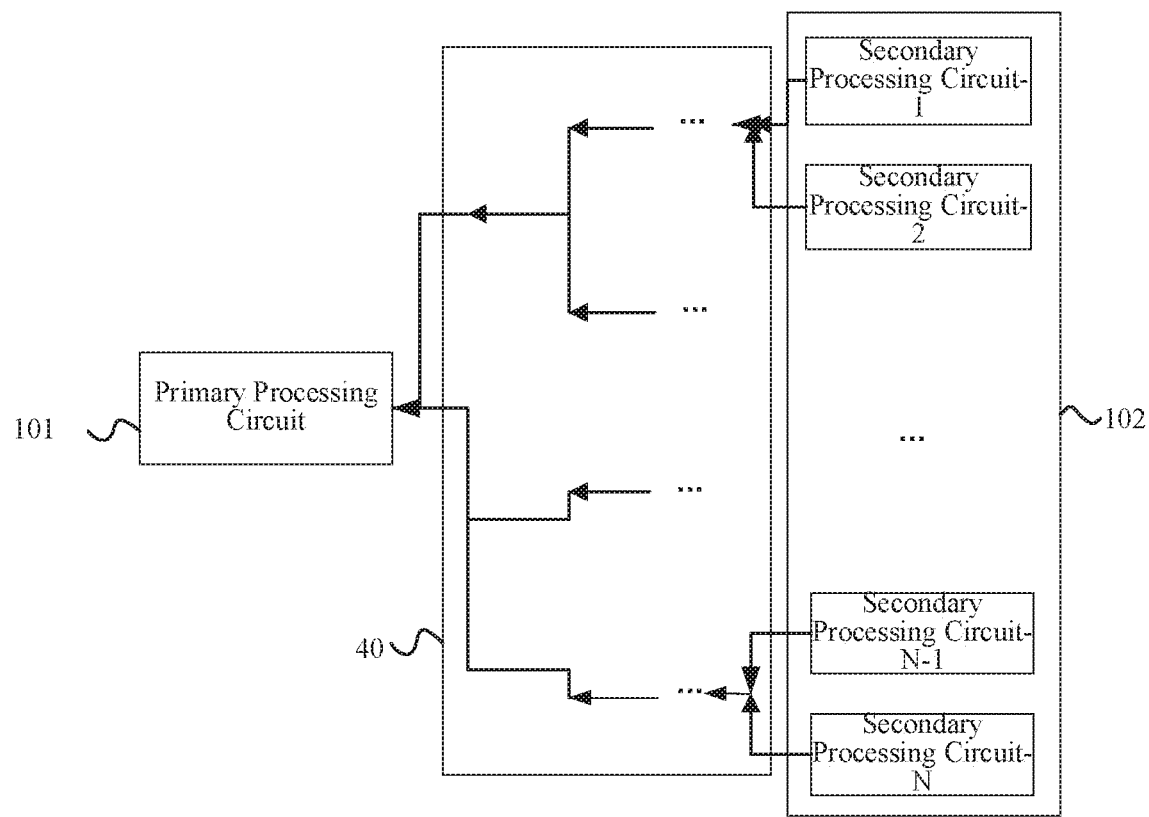
FIG. 2d is a receiving diagram of a tree module of an example of the present disclosure.

The tree module has receiving and transferring functions. For instance, as shown in FIG. 2c, the tree module has a transferring function, and as shown in FIG. 2d, the tree module has a receiving function.

The tree module is configured to forward data and operation instructions between the primary processing circuit and the plurality of secondary processing circuits.

Alternatively, the tree module is an optional structure of the computation device. The tree module may include at least one layer of nodes, where the nodes are line-structured with a forwarding function, and the nodes may not have a computation function. If the tree module has zero layer of nodes, the tree module may be unnecessary.

Alternatively, the tree module may have an n-ary tree structure, for instance, a binary tree structure shown in FIG. 2c. The tree module may also be a ternary tree structure, where n may be an integer greater than or equal to 2. Examples of the present disclosure do not restrict a specific value of the n, the count of layers may be 2, and the secondary processing circuits may be connected to nodes of layers except a last but one layer.

Alternatively, the primary processing circuit inside the operation unit may have an independent cache, which may include: a neuron caching unit configured to cache input neuron vector data and output neuron value data of the secondary processing circuits. The primary processing circuit may further include weight caching unit configured to cache weight data required by the secondary processing circuits during computations.

Figure 3:
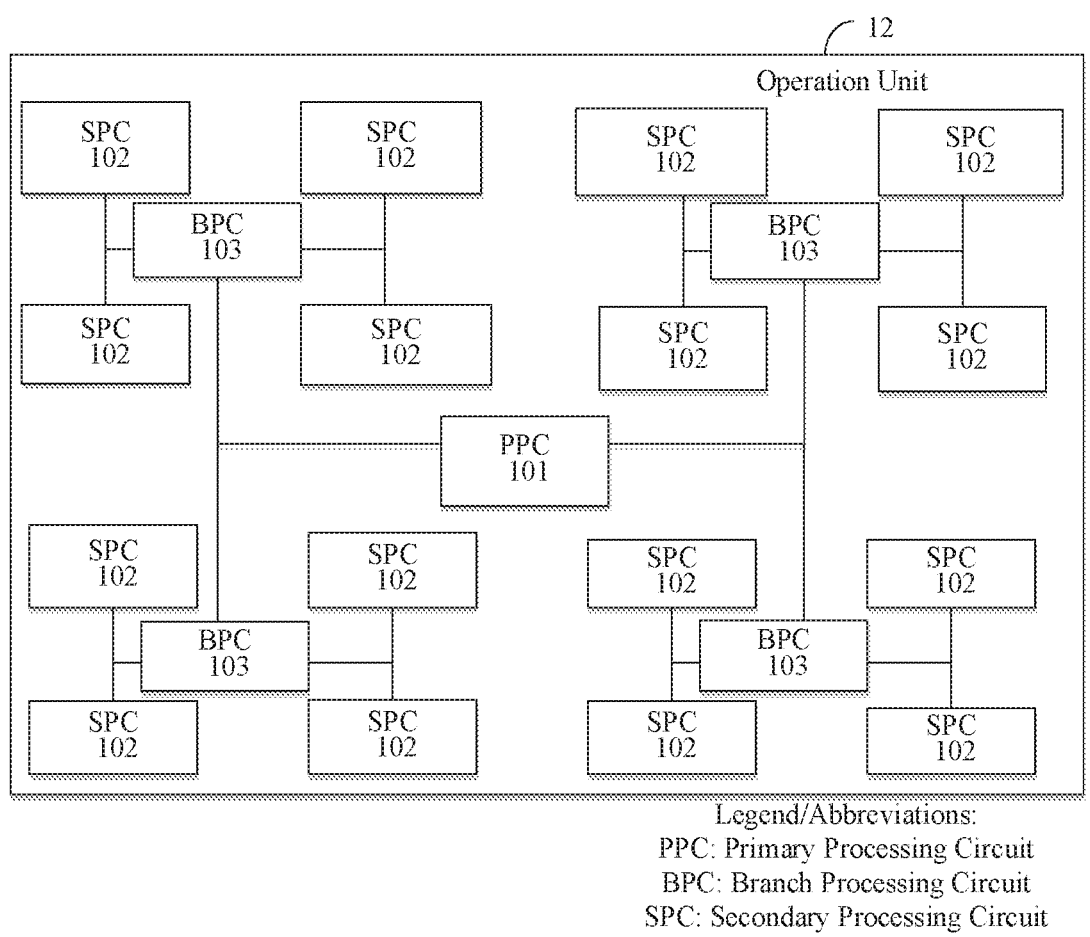
FIG. 3 is another structural diagram of an operation unit of an example of the present disclosure.

In an alternative example, as shown in FIG. 3, the operation unit 12 may include a branch processing circuit 103. A specific connection structure is shown in FIG. 3, where the primary processing circuit 101 is connected to one or a plurality of branch processing circuits 103, and each branch processing circuits 103 is connected to one or the plurality of secondary processing circuits 102; and the branch processing circuit 103 is configured to forward data or instructions between the primary processing circuit 101 and the secondary processing circuits 102.

Alternatively, a storage module may be arranged inside the branch processing circuit 103. The storage module may set one or more shared areas. The primary processing circuit and secondary processing circuits can write data in or read data from the shared areas. Setting the shared areas inside the branch processing circuit 103 may facilitate the data storage of the primary processing circuit and the secondary processing circuits. The overhead caused by reading and writing of data storage is low. In this way, the capacity of the storage modules of the primary processing circuit and the secondary processing circuits may be saved, thereby reducing the cost of the computation device.

In an optional example with a fully connected computation of neural network operations as an instance, a process may be: y=f(wx+b), where, x is an input neuron matrix, w is a weight matrix, b is a bias scalar, f is an activation function which may be any of sigmoid, tan h, relu, and softmax. It is assumed that there is a binary tree structure having 8 secondary processing circuits, then an implementation method may be:

obtaining, by the controller unit, the input neuron matrix x, the weight matrix w, and a fully connected operation instruction from the storage unit, and transferring the input neuron matrix x, the weight matrix w, and the fully connected operation instruction to the primary processing circuit;

determining, by the primary processing circuit, the input neuron matrix x as data for broadcasting, determining the weight matrix w as data for distribution, partitioning the weight matrix w into 8 sub-matrices, transferring the 8 sub-matrices to the 8 secondary processing circuits via the tree module, and broadcasting the input neuron matrix x to the 8 secondary processing circuits;

multiplying and accumulating, by the secondary processing circuits, the 8 sub-matrices and the input neuron matrix x to obtain 8 intermediate results, and transferring the 8 intermediate results to the primary processing circuit; and sorting, by the primary processing circuit, the 8 intermediate results to obtain an operation result of wx, performing a bias b operation then an activation operation on the operation result to obtain a final result y, sending the final result y to the controller unit; and outputting, by the controller unit, the final result y, or storing the final result y in the storage unit.

A method for sorting the 8 intermediate results to obtain the operation result of wx may be: for a matrix-multiply-matrix operation, determining some elements of the input neuron matrix x corresponding to the 8 sub-matrices, extracting a minimum value of rows of the 8 sub-matrices and a minimum value of columns of the some elements, then the minimum value of rows and the minimum value of columns are positions of the intermediate results in the operation result.

A method of performing a neural network forward operation instruction by the computation device as shown in FIG. 1 may include:

obtaining, by the controller unit, a neural network forward operation instruction, an operation field corresponding to the neural network operation instruction, and at least one opcode from the instruction storage unit; transferring, by the controller unit, the operation field to a data accessing unit, and transferring the at least one opcode to the operation unit;

obtaining, by the controller unit, a weight w and a bias b corresponding to the operation field from the storage unit (if b is 0, there is no need to obtain the bias b), transferring the weight w and the bias b to the primary processing circuit of the operation unit; obtaining, by the controller unit, input data Xi from the storage unit, and transferring the input data Xi to the primary processing circuit;

determining, by the primary processing circuit, the opcode as multiplication according to the at least one opcode, converting the input data Xi into fixed point input data Xi, converting weight data into fixed point weight data, determining the fixed point input data Xi as data for broadcasting, determining the fixed point weight data as data for distribution, and partitioning the fixed point weight w into n fixed point data blocks;

determining, by the instruction processing unit of the controller unit, a multiplication instruction, a bias instruction, and an accumulation instruction according to the at least one opcode, sending the multiplication instruction, the bias instruction, and the accumulation instruction to the primary processing circuit; broadcasting, by the primary processing circuit, the multiplication instruction and the input data Xi to the plurality of secondary processing circuits, and distributing the n fixed point data blocks to the plurality of secondary processing circuits (for instance, if there are n secondary processing circuits, each secondary processing circuit receives one data block); performing, by the plurality of secondary processing circuits, fixed point multiplication on the fixed point input data Xi and the received fixed point data blocks according to the multiplication instruction to obtain fixed point intermediate results, sending the fixed point intermediate result to the primary processing circuit; accumulating, by the primary processing circuit, the intermediate results sent from the plurality of secondary processing circuits according to the accumulation instruction to obtain an accumulation result, converting the accumulation result into floating point accumulation result, adding the bias b to the floating point accumulation result according to the bias instruction to obtain a final result, and sending the final result to the controller unit.

Figure 6:
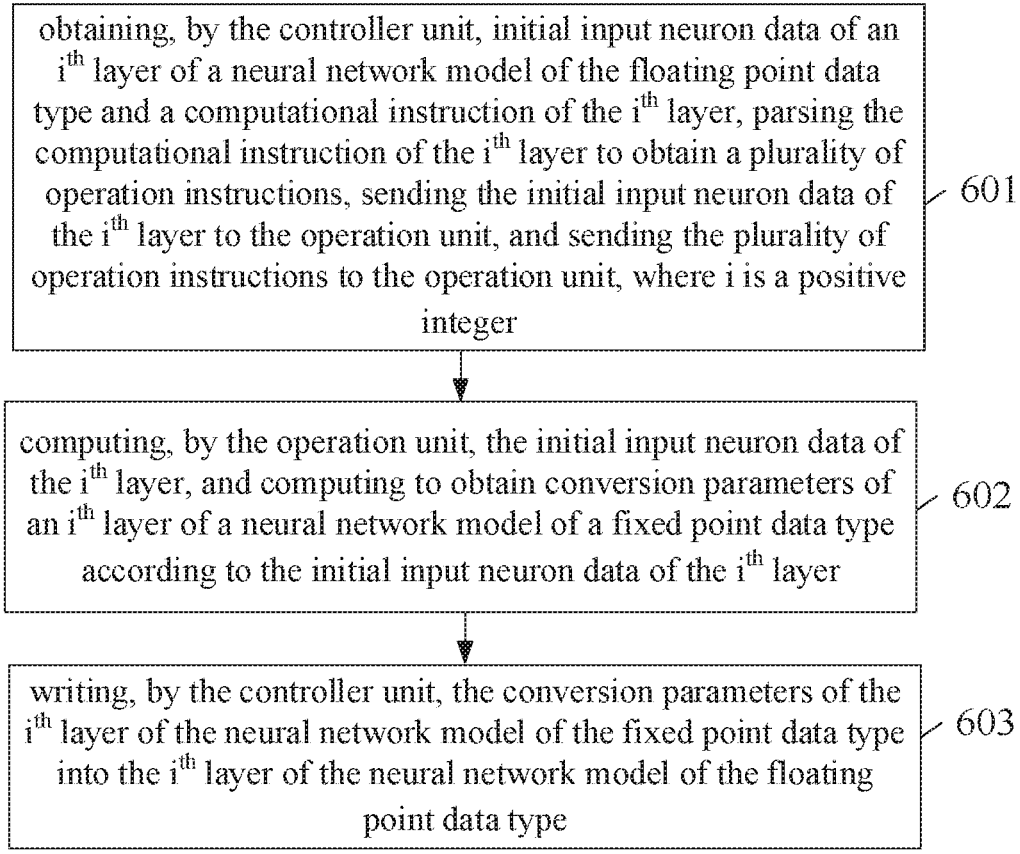
FIG. 6 is a flowchart of a neural network computation method of an example of the present disclosure.

FIG. 6 is a flowchart of a neural network computation method of an example of the present disclosure. As shown in FIG. 6, the computation method may be applied to a neural network computation device configured to perform artificial neural network training operations of floating point data type. The computation device includes a controller unit and an operation unit. The method includes:

601, obtaining, by the controller unit, initial input neuron data of an $i^{th}$ layer of a neural network model of the floating point data type and a computational instruction of the $i^{th}$ layer, parsing the computational instruction of the $i^{th}$ layer to obtain a plurality of operation instructions, sending the initial input neuron data of the $i^{th}$ layer to the operation unit, and sending the plurality of operation instructions to the operation unit, where i is a positive integer;

602, computing, by the operation unit, the initial input neuron data of the $i^{th}$ layer, and computing to obtain conversion parameters of an $i^{th}$ layer of a neural network model of a fixed point data type according to the initial input neuron data of the $i^{th}$ layer; and 603, writing, by the controller unit, the conversion parameters of the $i^{th}$ layer of the neural network model of the fixed point data type into the $i^{th}$ layer of the neural network model of the floating point data type.

Optionally, the computing the conversion parameters of the $i^{th}$ layer of the neural network model of the fixed point data type according to the initial input neuron data of the $i^{th}$ layer includes: if the conversion parameters only include a value of a decimal point position of a fixed point number, the computation formula is:

$$\text{a value of a floating point number} = \text{a value of a fixed point number} \times 2^{\text{position}};$$

or if the conversion parameters only include a value of a scale factor, the computation formula is:

$$\text{a value of a floating point number} = \text{a value of a fixed point number} \times \text{scale};$$

or if the conversion parameters include a position value and a scale factor value, the computation formula is:

$$\text{a value of a floating point number} = (\text{a value of a fixed point number} \times 2^{\text{position}})/\text{scale}.$$

position denotes the decimal point position of a fixed point number, and scale denotes the scale factor.

Alternatively, the neural network training operations include neural network multi-layer training operations. The multi-layer training operations includes the $i^{th}$ layer. Forward operations or back operations of the $i^{th}$ layer at least include some fixed point data operations, where i is an integer greater than or equal to 1. The neural network computation device further includes a conversion unit. The method further includes:

obtaining, by the controller unit, input neuron data of the $i^{th}$ layer, weight data of the $i^{th}$ layer, and a forward computational instruction of the $i^{th}$ layer;

parsing, by the controller unit, the computational instruction of the $i^{th}$ layer to obtain a plurality of forward operation instructions, sending the input neuron data of the $i^{th}$ layer and the weight data of the $i^{th}$ layer to the conversion unit, and sending the plurality of operation instructions to the operation unit;

if it is determined that the input neuron data of the $i^{th}$ layer includes a fixed point conversion identifier attribute, converting, by the conversion unit, all or part of the input neuron data of the $i^{th}$ layer and the weight data of the $i^{th}$ layer between the floating point data type and the fixed point data type according to the conversion parameters to obtain complete fixed point data or mixed data, and sending the complete fixed point data or mixed data to the operation unit, where the mixed data includes: some fixed point data and some floating point data; and performing, by the operation unit, fixed point operations on the complete fixed point data or mixed operations on the mixed data according to the plurality of forward operation instructions to obtain forward output results of the $i^{th}$ layer, where the mixed operations include fixed point operations on the some fixed point data and floating point operations on the some floating point data.

Alternatively, the method may include:

obtaining, by the controller unit, the input neuron data of the $i^{th}$ layer, the weight data of the $i^{th}$ layer, and the input neuron gradients of the $i^{th}$ layer; parsing the computational instruction of the $i^{th}$ layer to obtain a plurality of back operation instructions, sending the input neuron data of the $i^{th}$ layer, the weight data of the $i^{th}$ layer, and the input neuron gradients of the $i^{th}$ layer to the conversion unit, and sending the plurality of operation instructions to the operation unit;

converting, by the conversion unit, all or part of the input neuron data of the $i^{th}$ layer, the weight data of the $i^{th}$ layer, and the input neuron gradients of the $i^{th}$ layer between floating point data and fixed point data to obtain complete fixed point data or mixed data, and sending the complete fixed point data or mixed data to the operation unit, where the mixed data includes: some fixed point data and some floating point data; and performing, by the operation unit, fixed point operations on the complete fixed point data or mixed operations on the mixed data according to the plurality of forward operation instructions to obtain weight gradients of the $i^{th}$ layer and output result gradients of the $i^{th}$ layer, and using the weight gradients of the $i^{th}$ layer to update weights of the $i^{th}$ layer.

Alternatively, the method may include:

converting, by the conversion unit, all or part of the input neuron data of the $i^{th}$ layer and the weight data of the $i^{th}$ layer between floating point data to fixed point data to obtain complete fixed point data or mixed data, and sending the complete fixed point data or mixed data to the operation unit, where the mixed data includes: some fixed point data and some floating point data; and performing, by the operation unit, fixed point operations on the complete fixed point data or mixed operations on the mixed data according to the plurality of forward operation instructions to obtain forward output results of the $i^{th}$ layer, which includes:

converting, by the conversion unit, part of the input neuron data of the $i^{th}$ layer to some fixed point input neuron data, converting part of the weight data of the $i^{th}$ layer to some fixed point weight data, sending the some fixed point input neuron data and the some fixed point weight data to the operation unit, and sending some input neuron data and some weight data to the operation unit;

performing, by the operation unit, fixed point data operations on the some fixed point input neuron data and the some fixed point weight data to obtain some fixed point forward output results, and sending the some fixed point forward output results to the conversion unit;

converting, by conversion unit, the some fixed point forward output results between fixed point data and floating point data to obtain a first set of some floating point forward operation results, and sending the first set of some floating point forward operation results to the operation unit; and performing, by the operation unit, operations on the some input neuron data and the some weight data to obtain a second set of some floating point forward operation results, and combining the first set of some floating point forward operation results and the second set of some floating point forward operation results to obtain forward output results of the $i^{th}$ layer.

Optionally, the method may include:

converting, by the conversion unit, part of the input neuron data of the $i^{th}$ layer to some fixed point input neuron data, converting part of the weight data of the $i^{th}$ layer to some fixed point weight data, converting the input neuron gradients of the $i^{th}$ layer to some fixed point input neuron gradients, sending the some fixed point input neuron data, the some fixed point input neuron gradients, and the some fixed point weight data to the operation unit, and sending some input neuron data, some input neuron gradients, and some weight data to the operation unit;

performing, by the operation unit, fixed point data operations on the some fixed point input neuron gradients and the some fixed point input data to obtain some weight gradients of the $i^{th}$ layer, performing fixed point data operations on the some fixed point input neuron gradients and the some fixed point weight data to obtain some output result gradients of the $i^{th}$ layer, and sending the some weight gradients of the $i^{th}$ layer and the some output result gradients of the $i^{th}$ layer to the conversion unit;

converting, by the conversion unit, the some weight gradients of the $i^{th}$ layer and the some output result gradients of the $i^{th}$ layer between fixed point data and floating point data to obtain a first set of some weight gradients of the $i^{th}$ layer and a first set of some output result gradients of the $i^{th}$ layer, and sending the first set of some weight gradients of the $i^{th}$ layer and the first set of some output result gradients of the $i^{th}$ layer to the operation unit; and performing, by the operating unit, operations on the some input neuron gradients and the some input data to obtain a second set of some weight gradients of the $i^{th}$ layer, performing operations on the some input neuron gradients and the some weight data to obtain a second set of some output result gradients of the $i^{th}$ layer, combining the first set of some weight gradients of the $i^{th}$ layer and the second set of some weight gradients of the $i^{th}$ layer to obtain weight gradients of the $i^{th}$ layer, and combining the first set of some output result gradients of the $i^{th}$ layer and the second set of some output result gradients of the $i^{th}$ layer to obtain output result gradients of the $i^{th}$ layer.

The technical solution provided by the present disclosure can realize multiplication operations and bias operations of neural networks according to one instruction, which is a neural network operation instruction. There is no need to store or obtain intermediate results of neural network operations. The technical solution may reduce the storing and obtaining of intermediate data, and may reduce corresponding operation steps and improve computational outcomes of neural networks.

The present disclosure further provides a neural network computation device which may include one or a plurality of the computation devices mentioned in the present disclosure. The neural network device is configured to obtain data to be operated and control information from other processing devices, perform designated neural network training computations, and transfer operation results to a peripheral apparatus via an I/O interface. The peripheral apparatus includes a camera, a monitor, a mouse, a keyboard, a network card, a WIFI interface, and a server. When more than one computation devices are included, the computation devices may be connected to each other and transfer data to each other through a specific structure, for instance, the computation devices may realize interconnection and data transfer through a PCIE bus, so as to support large scale machine learning operations. In this case, the computation devices may share the same control system, or have their own independent control systems. The computation devices may share a memory, or have their own memories. In addition, an interconnection manner of the computation devices may be any interconnection topology.

The neural network computation devices may have good compatibility and may be connected to various types of servers through a PCIE interface.

Figure 4:
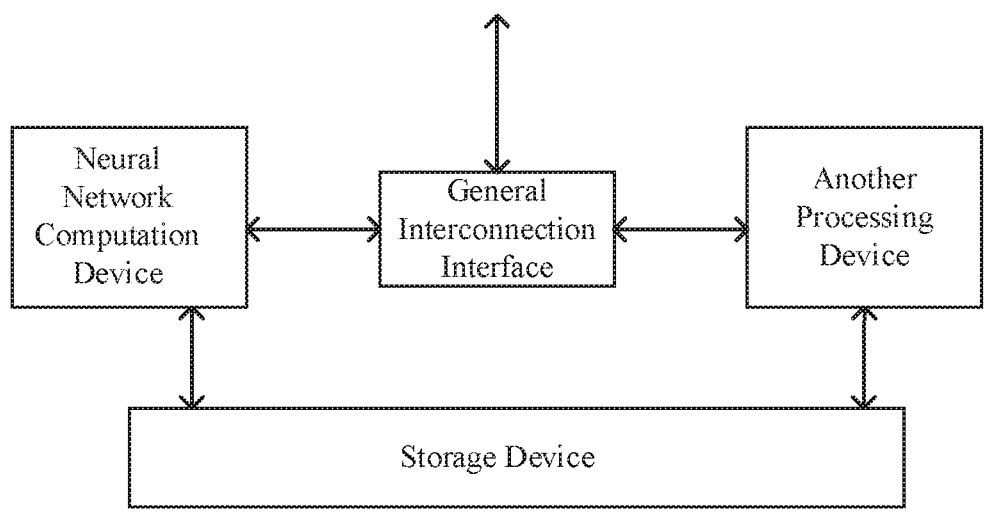
FIG. 4 is a structural diagram of a combined processing device of an example of the present disclosure.

The present disclosure also provides a combined processing device which includes the above-mentioned neural network computation device, a general interconnection interface, and another processing device. The neural network computing apparatus may interact with other processing devices to perform operations specified by users. FIG. 4 is a schematic diagram of the combined processing device.

Another processing device may include at least one or more of a general-purpose/special-purpose processors such as a central processing unit (CPU), a graphics processing unit (GPU), a neural network processor, and the like. The present disclosure does not restrict a count of processors included in the other processing devices. Another processing device may serve as interfaces that connect the neural network computation device and external data and control including data moving, and may perform basic control such as starting and stopping the neural network computation device. Another processing device may also cooperate with the neural network computation device to complete operation tasks.

The general interconnection interface is configured to transfer data and control instructions between the neural network computation device and another processing device. The neural network computation device obtains required input data from the other processing devices and write the data in an on-chip storage device of the neural network computation device. The neural network computation device may obtain control instructions from another processing device, and write the control instructions in an on-chip control cache of the neural network computation device. The neural network computation device may further read data stored in a storage module of the neural network computation device and transfer the data to another processing device.

Alternatively, as shown in FIG. 4, the structure may include a storage means. The storage means is connected to the neural network computation device and another processing device respectively. The storage means is configured to store data of the neural network computation device and another processing device. The storage means may be particularly suitable for a case where data to be computed cannot be entirely stored in an internal memory of the machine learning computation device or another processing device.

The combined processing device can be used as an SOC (System on Chip) of a device including a mobile phone, a robot, a drone, a video surveillance device, and the like, which may effectively reduce the core area of a control part, increase the processing speed, and reduce the overall power consumption. In this case, a universal interconnection interface of the combined processing device may be connected to some components of the device. The some components include webcams, monitors, mice, keyboards, network cards, and WIFI interfaces.

In some examples, the present disclosure provides a chip including the neural network computation device or the combined processing device.

In some examples, the present disclosure provides a chip package structure including the chip.

Figure 5:
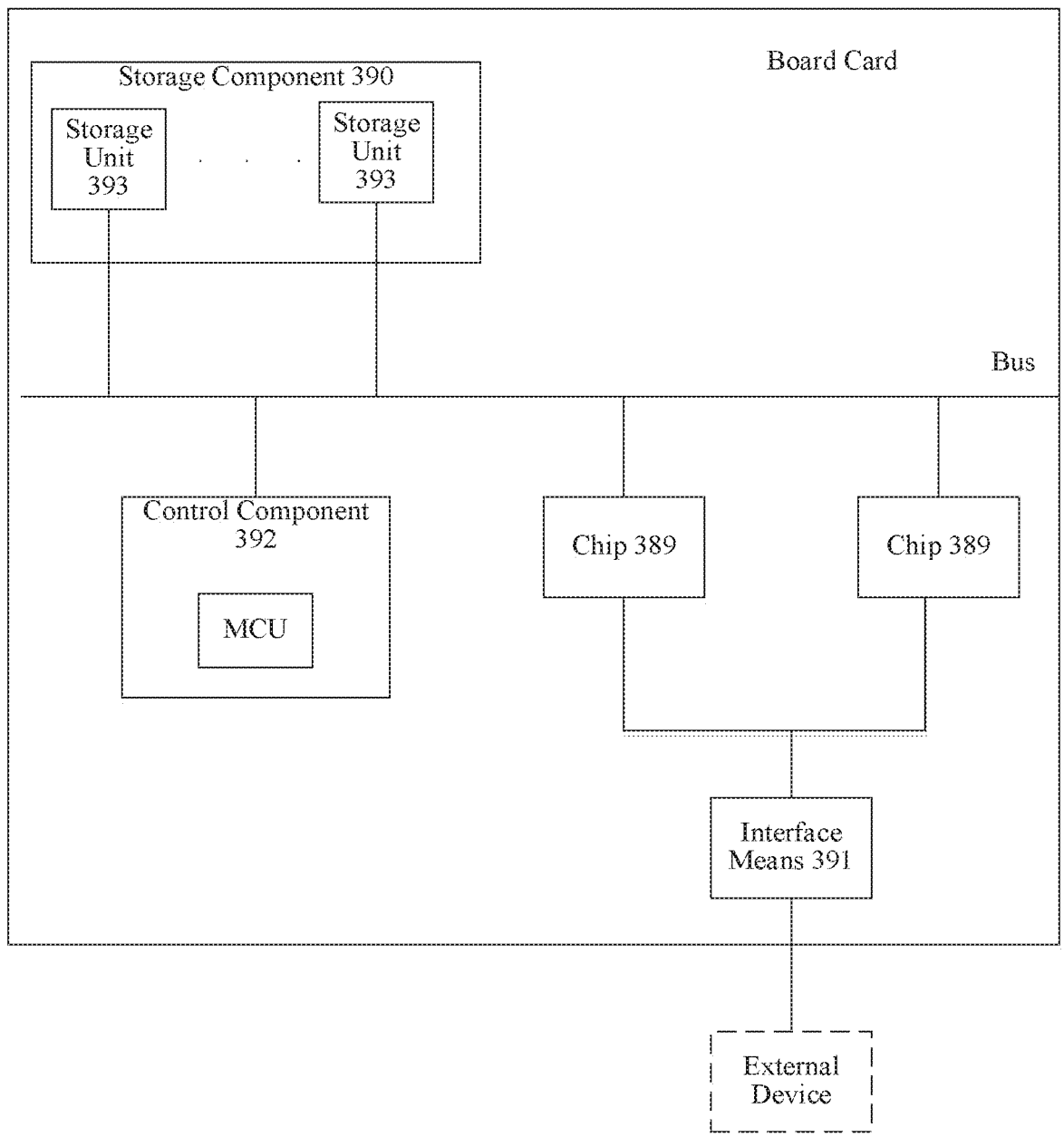
FIG. 5 is a structural diagram of a board card of an example of the present disclosure.

In some examples, the present disclosure provides a board card including the chip package structure. Referring to FIG. 5 which provides a board card, in addition to the above-mentioned chip 389, the board card may further include other matching components. The matching components may include but not limited to: a storage component 390, an interface means 391, and a control component 392.

The storage component 390 is connected to the chip inside the chip package structure via a bus, and is configured to store data. The storage component may include a plurality groups of storage units 393. Each group of storage units is connected to the chip via the bus. It can be understood that each group of the storage units may be DDR SDRAM (Double Data Rate SDRAM).

DDR can double the speed of SDRAM without increasing the clock frequency. DDR allows data reading on the rising and falling edges of the clock pulse. The speed of DDR is twice the speed of standard SDRAM. In an example, the storage device may include four groups of storage units. Each group of the storage units may include a plurality of DDR4 particles (chips). In an example, four 72-bit DDR4 controllers may be arranged inside the chip, where 64 bits of each 72-bit DDR4 controller are for data transfer and 8 bits are for ECC parity. It can be understood that when each group of the storage units adopts DDR4-3200 particles, the theoretical bandwidth of data transfer may reach 25600 MB/s.

In one example, each group of the storage units may include a plurality of DDR SDRAMs (Double Data Rate Synchronous Dynamic Random Access Memory) arranged in parallel. DDR can transfer data for two times per clock cycle. A DDR controller may be arranged inside the chip. The DDR controller is configured to control the data transfer and the data storage of each storage unit.

The interface means may be electrically connected to the chip inside the chip package structure. The interface means is configured to realize data transfer between the chip and an external device (such as a server or a computer). In one example, the interface means may be a standard PCIE interface. For instance, data to be processed may be transferred by a server via the standard PCIE interface to the chip, thereby realizing data transfer. Alternatively, when a PCIE 3.0×16 interface is adopted for transferring, the theoretical bandwidth may reach 16000 MB/s. In another example, the interface means may also be another interface. The present disclosure does not restrict a specific form of another interface as long as the interface unit can realize the transferring function. In addition, a computation result of the chip may still be transferred by the interface means to an external device (such as a server).

The control component is electrically connected to the chip. The control component is configured to monitor a status of the chip. Specifically, the chip and the control component can be electrically connected through a SPI interface. The control component may include an MCU (Micro Controller Unit). If the chip includes a plurality of processing chips, a plurality of processing cores, or a plurality of processing circuits, the chip is capable of driving a plurality of loads. In this case, the chip can be in different working status such as multi-load status and light-load status. The working status of the plurality of processing chips, the plurality of processing cores, or a plurality of processing circuits can be regulated and controlled by the control device.

Some examples provide an electronic device which includes the board card.

The electronic device may include a data processing device, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or medical equipment.

The vehicle may include an airplane, a ship, and/or a car. The household appliance may include a television, an air conditioner, a microwave oven, a refrigerator, a rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

It should be noted that, the foregoing examples of method, for the sake of conciseness, are all described as a series of action combinations, but those skilled in the art should know that since according to the present disclosure, the steps may be performed in a different order or simultaneously, the disclosure is not limited by the described order of action. Secondly, those skilled in the art should also know that the examples described in the specification are all preferred examples, and the action and modules involved are not necessarily compulsory for this disclosure.

In the above examples, the description of each example has its own emphasis. For a part that is not described in detail in one example, reference may be made to related descriptions in other examples.

It should be understood that in the examples provided by the present disclosure, the disclosed device may be implemented in another manner. For instance, the examples of device above are merely illustrative. For instance, the division of the units is only a logical function division. In a real implementation, there may be another manner for division. For instance, a plurality of units or components may be combined or may be integrated in another system, or some features may be ignored or not performed. In addition, the displayed or discussed mutual coupling, direct coupling, or communication connection may be implemented through some interfaces, or through the indirect coupling or communication of devices or units, which may be electrical or other forms.

The units described as separate components may or may not be physically separated. The components shown as units may or may not be physical units. In other words, the components may be located in one place, or may be distributed to a plurality of network units. According to actual needs, some or all of the units may be selected for realizing the purposes of the examples of the present disclosure.

Those skilled in the art should understand that all or some of the steps in the various methods of the foregoing examples may be implemented by a program instructing related hardware. The program may be stored in a computer readable memory. The readable memory may include: a flash disk, a read-only memory (ROM), a random access memory (RAM), or an optical disk.

The examples of the present disclosure have been described in detail above. Specific examples have been used to explain the principles and implementation of the present disclosure. The descriptions of the examples above are only used to facilitate the understanding of the method and core ideas of the disclosure. For those of ordinary skill in the art, according to the ideas of the present disclosure, there may be changes in the implementation and scope of the disclosure. In summary, the content of this specification should not be construed as a limitation on the present disclosure.

The invention claimed is:

1. A neural network computation device configured to perform neural network operations of a floating point data type, comprising: a controller unit and an operation unit, wherein the controller unit and the operation unit are connected;
the controller unit is configured to obtain initial input neuron data of an $i^{th}$ layer of a neural network model of the floating point data type and a computational instruction of the $i^{th}$ layer, parse the computational instruction of the $i^{th}$ layer to obtain a plurality of operation instructions, send the initial input neuron data of the $i^{th}$ layer to the operation unit, and send the plurality of operation instructions to the operation unit, wherein i is a positive integer;

the operation unit is configured to compute the initial input neuron data of the $i^{th}$ layer, and compute conversion parameters of an $i^{th}$ layer of a neural network model of a fixed point data type according to the initial input neuron data of the $i^{th}$ layer; and the controller unit is further configured to write the conversion parameters of the $i^{th}$ layer of the neural network model of the fixed point data type into the $i^{th}$ layer of the neural network model of the floating point data type, wherein regarding the computing the conversion parameters of the $i^{th}$ layer of the neural network model of the fixed point data type according to the initial input neuron data of the $i^{th}$ layer, the operation unit is configured to compute the conversion parameters of the $i^{th}$ layer of the neural network model of the fixed point data type according to the following formula:

if the conversion parameters only include a value of a decimal point position of a fixed point number, the computation formula is:

a value of a floating point number=a value of a fixed point number×2^position, or if the conversion parameters only include a value of a scale factor, the computation formula is:

a value of a floating point number=a value of a fixed point number×scale, or if the conversion parameters include a position value and a scale factor value, the computation formula is:

a value of a floating point number=(a value of a fixed point number×2^position)/scale, wherein position denotes the decimal point position of a fixed point number, and scale denotes the scale factor.

2. The computation device of claim 1, wherein training operations of the neural network include neural network multi-layer training operations, the multi-layer training operations includes the $i^{th}$ layer, forward operations or back operations of the $i^{th}$ layer at least include some fixed point data operations, wherein i is an integer greater than or equal to 1, the device further includes a conversion unit, wherein the controller unit is configured to obtain input neuron data of the $i^{th}$ layer, weight data of the $i^{th}$ layer, and a forward computational instruction of the $i^{th}$ layer, the controller unit is further configured to parse the computational instruction of the $i^{th}$ layer to obtain a plurality of forward operation instructions, send the input neuron data of the $i^{th}$ layer and the weight data of the $i^{th}$ layer to the conversion unit, and send the plurality of operation instructions to the operation unit, the conversion unit is configured to, if it is determined that the input neuron data of the $i^{th}$ layer includes a fixed point conversion identifier attribute, convert all or part of the input neuron data of the $i^{th}$ layer and the weight data of the $i^{th}$ layer between the floating point data type and the fixed point data type according to the conversion parameters to obtain complete fixed point data or mixed data, and send the complete fixed point data or mixed data to the operation unit, wherein the mixed data includes: some fixed point data and some floating point data, and the operation unit is configured to perform fixed point operations on the complete fixed point data or mixed operations on the mixed data according to the plurality of forward operation instructions to obtain forward output results of the $i^{th}$ layer, wherein the mixed operations include fixed point operations on the some fixed point data and floating point operations on the some floating point data.

3. The computation device of claim 2, wherein the controller unit is further configured to obtain the input neuron data of the $i^{th}$ layer, the weight data of the $i^{th}$ layer, input neuron gradients of the $i^{th}$ layer, and a back computational instruction of the $i^{th}$ layer, the controller unit is further configured to parse the computational instruction of the $i^{th}$ layer to obtain a plurality of back operation instructions, send the input neuron data of the $i^{th}$ layer, the weight data of the $i^{th}$ layer, and the input neuron gradients of the $i^{th}$ layer to the conversion unit, and send the plurality of operation instructions to the operation unit, the conversion unit is configured to convert all or part of the input neuron data of the $i^{th}$ layer, the weight data of the $i^{th}$ layer, and input neuron gradients of the $i^{th}$ layer between floating point data and fixed point data to obtain complete fixed point data or mixed data, and send the complete fixed point data or mixed data to the operation unit, wherein the mixed data includes: some fixed point data and some floating point data, and the operation unit is configured to perform fixed point operations on the complete fixed point data or mixed operations on the mixed data according to the plurality of back operation instructions to obtain weight gradients of the $i^{th}$ layer and output result gradients of the $i^{th}$ layer, and update weights of the $i^{th}$ layer according to the weight gradients of the $i^{th}$ layer.

4. The computation device of claim 2, wherein the conversion unit is configured to convert part of the input neuron data of the $i^{th}$ layer to some fixed point input neuron data, convert part of the weight data of the $i^{th}$ layer to some fixed point weight data, send the some fixed point input neuron data and the some fixed point weight data to the operation unit, and send some input neuron data and some weight data to the operation unit, the operation unit is configured to perform fixed point data operations on the some fixed point input neuron data and the some fixed point weight data to obtain some fixed point forward output results, and send the some fixed point forward output results to the conversion unit, the conversion unit is configured to convert the some fixed point forward output results between fixed point data and floating point data to obtain a first set of some floating point forward operation results, and send the first set of some floating point forward operation results to the operation unit, and the operation unit is configured to perform operations on the some input neuron data and the some weight data to obtain a second set of some floating point forward operation results, and combine the first set of some floating point forward operation results and the second set of some floating point forward operation results to obtain forward output results of the $i^{th}$ layer.

5. The computation device of claim 2, wherein the conversion unit is configured to convert part of the input neuron data of the $i^{th}$ layer to some fixed point input neuron data, convert part of the weight data of the $i^{th}$ layer to some fixed point weight data, convert the input neuron gradients of the $i^{th}$ layer to some fixed point input neuron gradients, send the some fixed point input neuron data, the some fixed point input neuron gradients and the some fixed point weight data to the operation unit, and send some input neuron data, some input neuron gradients, and some weight data to the operation unit, the operation unit is configured to perform fixed point data operations on the some fixed point input neuron gradients and the some fixed point input data to obtain some weight gradients of the $i^{th}$ layer, perform fixed point data operations on the some fixed point input neuron gradients and the some fixed point weight data to obtain some output result gradients of the $i^{th}$ layer, and send the some weight gradients of the $i^{th}$ layer and the some output result gradients of the $i^{th}$ layer to the conversion unit, the conversion unit is configured to convert the some weight gradients of the $i^{th}$ layer and the some output result gradients of the $i^{th}$ layer between floating point data and fixed point data to obtain a first set of some weight gradients of the $i^{th}$ layer and a first set of some output result gradients of the $i^{th}$ layer, and send the first set of some weight gradients of the $i^{th}$ layer and the first set of some output result gradients of the $i^{th}$ layer to the operation unit, and the operating unit is configured to perform operations on the some input neuron gradients and the some input data to obtain a second set of some weight gradients of the $i^{th}$ layer, perform operations on the some input neuron gradients and the some weight data to obtain a second set of some output result gradients of the $i^{th}$ layer, combine the first set of some weight gradients of the $i^{th}$ layer and the second set of some weight gradients of the $i^{th}$ layer to obtain weight gradients of the $i^{th}$ layer, and combine the first set of some output result gradients of the $i^{th}$ layer and the second set of some output result gradients of the $i^{th}$ layer to obtain output result gradients of the $i^{th}$ layer.

6. The computation device of claim 4, wherein the conversion unit is configured to determine point which denotes a position of a decimal point of a floating point number, $$\text{point} = \lceil (\log_2(\text{max abs}) - \text{width} + 2) \rceil$$

wherein max abs denotes a largest absolute value in floating point data to be converted, width denotes a bit width of a fixed point number, wherein $$\text{int} = \begin{cases} -2^{width-1}, & \text{if float} < -2^{width+point-1} \\ \text{round}(\text{float}/2^{point}), & \text{if} -2^{width+point-1} \leq \text{float} \leq (2^{point-1}-1)*2^{point} \\ 2^{width-1}-1, & \text{if float} > (2^{width-1}-1)*2^{point} \end{cases}$$

float=int*$2^{point}$, float denotes a value of the floating point data, int denotes a value of a fixed point number.

7. The device of claim 4, wherein a method of obtaining the input neuron gradients of the $i^{th}$ layer includes:

receiving, by the controller unit, output result gradients of an $i+1^{th}$ layer, and sending the output result gradients of the $i+1^{th}$ layer to the operation unit, obtaining, by the operation unit, the input neuron gradients of the $i^{th}$ layer according to the output result gradients of the i+i$^{th}$ layer, the input neuron gradients of the $i^{th}$ layer=f'*the output result gradients of the i+1$^{th}$ layer, wherein f' denotes a derived function of an activation function f.

8. The device of claim 4, wherein the operation unit includes a primary processing circuit and a plurality of secondary processing circuits, wherein the primary processing circuit is configured to preprocess data, and transfer data and operation instructions between the plurality of secondary processing circuits, the plurality of secondary processing circuits are configured to perform intermediate operations in parallel according to the data and the operation instructions transferred from the primary processing circuit to obtain a plurality of intermediate results, and transfer the plurality of intermediate results to the primary processing circuit, and the primary processing circuit is configured to obtain a forward output result of the $i^{th}$ layer, an output result gradient of the $i^{th}$ layer, and a weight gradient of the $i^{th}$ layer according to the plurality of intermediate results, and update a weight of the $i^{th}$ layer according to the weight gradient of the $i^{th}$ layer.

9. The device of claim 8, wherein the primary processing circuit includes a first storage unit, a first operation unit, a first data dependency determination unit, and a first storage unit, wherein:

a neuron caching unit is configured to cache input data and output data used by the primary processing circuit when performing computations, the first operation unit is configured to perform various operation functions of the primary processing circuit, and the first data dependency determination unit is configured to read an input neuron vector from the first storage unit, send the input neuron vector to the secondary processing circuits through an interconnection module, and receive an intermediate result vector from the interconnection module, and send the intermediate result vector to the first operation unit, and the first operation unit includes a vector addition unit and an activation operation unit, wherein the vector addition unit is configured to perform element-wise addition on bias data and the intermediate results to obtain a bias result, and the activation operation unit is configured to perform an activation function operation on the bias result.

10. The device of claim 8, wherein each secondary processing circuit includes a second operation unit, a second data dependency determination unit, a second storage unit, and a third storage unit, wherein the second operation unit is configured to perform arithmetic logic operations, the second data dependency determination unit is configured to perform read/write operations on the second storage unit and the third storage unit, the second storage unit is configured to cache data of an input neuron vector and cache an output neuron value obtained by the secondary processing circuit, the third storage unit is configured to cache a weight vector required during a computation process of the secondary processing, and the second operation unit includes a vector multiplication unit and an accumulation unit, wherein the vector multiplication unit is configured to perform vector multiplication operations in dot product operations, and the accumulation unit is configured to perform accumulation operations in dot product operations.

11. A neural network computation method applied to a neural network computation device, wherein the device is configured to perform artificial neural network operations of a floating point data type and includes a controller unit and an operation unit, and the method includes:

obtaining, by the controller unit, initial input neuron data of an $i^{th}$ layer of a neural network model of the floating point data type and a computational instruction of the $i^{th}$ layer, parsing the computational instruction of the $i^{th}$ layer to obtain a plurality of operation instructions, sending the initial input neuron data of the $i^{th}$ layer to the operation unit, and sending the plurality of operation instructions to the operation unit, wherein i is a positive integer;

computing, by the operation unit, the initial input neuron data of the $i^{th}$ layer, and computing conversion parameters of an $i^{th}$ layer of a neural network model of a fixed point data type according to the initial input neuron data of the $i^{th}$ layer; and writing, by the controller unit, the conversion parameters of the $i^{th}$ layer of the neural network model of the fixed point data type into the $i^{th}$ layer of the neural network model of the floating point data type, wherein the computing the conversion parameters of the $i^{th}$ layer of the neural network model of the fixed point data type according to the initial input neuron data of the $i^{th}$ layer further includes:

computing the conversion parameters of the $i^{th}$ layer of the neural network model of the fixed point data type according to the following formula:

if the conversion parameters only include a value of a decimal point position of a fixed point number, the computation formula is:

a value of a floating point number=a value of a fixed point number×2$^{position}$, or if the conversion parameters only include a value of a scale factor, the computation formula is:

a value of a floating point number=a value of a fixed point number×scale, or if the conversion parameters include a position value and a scale factor value, the computation formula is:

a value of a floating point number=(a value of a fixed point number×2$^{position}$)/scale, wherein position denotes the decimal point position of a fixed point number, and scale denotes the scale factor.

12. The method of claim 11, wherein the neural network training operations include neural network multi-layer training operations, the multi-layer training operations includes the $i^{th}$ layer, forward operations or back operations of the $i^{th}$ layer at least include some fixed point data operations, wherein i is an integer greater than or equal to 1, the neural network computation device further includes a conversion unit, and the method further includes:

obtaining, by the controller unit, input neuron data of the $i^{th}$ layer, weight data of the $i^{th}$ layer, and a forward computational instruction of the $i^{th}$ layer, parsing, by the controller unit, the computational instruction of the $i^{th}$ layer to obtain a plurality of forward operation instructions, sending the input neuron data of the $i^{th}$ layer and the weight data of the $i^{th}$ layer to the conversion unit, and sending the plurality of operation instructions to the operation unit, if it is determined that the input neuron data of the $i^{th}$ layer includes a fixed point conversion identifier attribute, converting, by the conversion unit, all or part of the input neuron data of the $i^{th}$ layer and the weight data of the $i^{th}$ layer between the floating point data type and the fixed point data type according to the conversion parameters to obtain complete fixed point data or mixed data, and sending the complete fixed point data or mixed data to the operation unit, wherein the mixed data includes: some fixed point data and some floating point data, and performing, by the operation unit, fixed point operations on the complete fixed point data or mixed operations on the mixed data according to the plurality of forward operation instructions to obtain forward output results of the $i^{th}$ layer, wherein the mixed operations include fixed point operations on the some fixed point data and floating point operations on some floating point data.

* * * * *